(12) United States Patent
Kuriki (10) Patent No.: US 9,593,817 B2
(45) Date of Patent: Mar. 14, 2017

(54) HEADLIGHT DEVICE OF MOTORCYCLE

(71) Applicant: HONDA MOTOR CO., LTD., Tokyo (JP)

(72) Inventor: Daisuke Kuriki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 14/383,568

(22) PCT Filed: Feb. 8, 2013

(86) PCT No.: PCT/JP2013/053129
§ 371 (c)(1),
(2) Date: Sep. 8, 2014

(87) PCT Pub. No.: WO2013/145895
PCT Pub. Date: Oct. 3, 2013

(65) Prior Publication Data
US 2015/0124467 A1      May 7, 2015

(30) Foreign Application Priority Data

Mar. 29, 2012   (JP) ................. 2012-075546

(51) Int. Cl.
*F21S 8/10*          (2006.01)
*B62J 6/02*          (2006.01)
(Continued)

(52) U.S. Cl.
CPC ........ *F21S 48/1317* (2013.01); *B60Q 1/0041* (2013.01); *B60Q 1/0683* (2013.01);
(Continued)

(58) Field of Classification Search
CPC ............... F21S 48/1317; F21S 48/1388; F21S 48/1159; B60Q 1/0041; B60Q 1/0058; B62J 6/02; B62J 6/00
(Continued)

(56) References Cited

U.S. PATENT DOCUMENTS 6,390,656 B1 * 5/2002 Suda ................... B60Q 1/0041
                                                         362/473
8,388,201 B2    3/2013 Ohzono
(Continued)

FOREIGN PATENT DOCUMENTS

JP       2007-035499       2/2007
JP        4753310 B2       3/2008
(Continued)

OTHER PUBLICATIONS

International Search Report for corresponding International Application No. PCT/JP2013/053129, Apr. 23, 2013.
(Continued)

*Primary Examiner* — Robert May
*Assistant Examiner* — Leah S Macchiarolo
(74) *Attorney, Agent, or Firm* — Mori & Ward, LLP (57) ABSTRACT

A high beam reflector (341) is disposed below a high beam LED light source (46) and reflects light from the high beam LED light source (46) in front of a vehicle. Low beam reflectors (342, 343) are disposed below a low beam LED light source (45) and reflect light from the low beam LED light source (45) in front of the vehicle. The low beam LED light source (45) is located on either side of the high beam LED light source (46) and disposed in front of the high beam LED light source (46). The high beam reflector (341) is longer than the low beam reflectors (342, 343) in the front-rear direction, and the low beam reflectors (342, 343) are positioned before the high beam reflector (341).

8 Claims, 5 Drawing Sheets

(51) Int. Cl.
*B62K 11/10* (2006.01)
*B60Q 1/00* (2006.01)
*B60Q 1/068* (2006.01)

(52) U.S. Cl.
CPC ............. *B62J 6/02* (2013.01); *B62K 11/10* (2013.01); *F21S 48/1159* (2013.01); *F21S 48/15* (2013.01); *F21S 48/215* (2013.01)

(58) Field of Classification Search
USPC ........................................ 362/473, 474, 476
See application file for complete search history.

(56) References Cited

U.S. PATENT DOCUMENTS

| | | | |
|---|---|---|---|
| 2005/0128765 A1* | 6/2005 | Matsumoto | B60Q 1/0041 362/514 |
| 2009/0040779 A1 | 2/2009 | Ohzono | |
| 2010/0246205 A1* | 9/2010 | Tanaka | B60Q 1/0041 362/544 |
| 2013/0286674 A1* | 10/2013 | Oguchi | F21V 7/00 362/516 |
| 2014/0286026 A1* | 9/2014 | Hayashi | B60Q 1/0094 362/475 |

FOREIGN PATENT DOCUMENTS

| | | |
|---|---|---|
| JP | 2009-040203 | 2/2009 |
| JP | 2009-046087 | 3/2009 |

OTHER PUBLICATIONS

Written Opinion for corresponding International Application No. PCT/JP2013/053129, Apr. 23, 2013.

\* cited by examiner

HEADLIGHT DEVICE OF MOTORCYCLE

TECHNICAL FIELD

The present invention relates to a headlight device of a motorcycle, and in particularly to a headlight device of a motorcycle suitable for emphasizing a light-emitting image of a low beam light of the same and a high beam light housed in an integral housing.

BACKGROUND ART

In the headlight device for the motorcycle integrally housing the low beam light and the high beam light, there has been conventionally disclosed a configuration of arranging a bulb light in the center in a vehicle width direction as the high beam light and arranging projector lights on either side of the high beam as the low beam lights. Hereinafter, the "low beam light" and the "high beam light" are simply described as a "low beam" and a "high beam" respectively.

CITATION LIST

Patent Literature

Patent Literature 1: Japanese Examined Patent Publication No. 4753310

SUMMARY OF INVENTION

Technical Problem

Where LEDs (light-emitting diodes) are applied instead of the bulb light and projector lights described in Patent Literature 1, there is conceived a structure in which a LED light source is disposed above a reflector formed by being curved downwardly and light from the LED light source is reflected forward and illuminated in front of the vehicle. The headlight device integrally housing the low beam and the high beam requires the length of a high beam reflector to be longer than that of a low beam reflector in order to secure light distribution characteristics of the high beam. As a result, it is thought that the shape of the high beam is conspicuous and a light-emitting image of the low beam is made inconspicuous.

A purpose of the present invention is to solve the problem and to provide a headlight device of a motorcycle that a headlight device of a motorcycle that a light-emitting image of a low beam can be emphasized whether a high beam LED light source is on or off, and light distribution characteristics required as a headlight are achieved in an integral headlight of low beam and high beam LED light sources.

Solution to Problem

To solve the afore-mentioned problem, the present invention has a first feature in that a headlight device of a motorcycle comprising: a high beam LED light source (46) and a low beam LED light source (45); a high beam reflector (341) disposed below the high beam LED light source (46), the high beam reflector having a downwardly curved shape so as to reflect light from the high beam LED light source (46) to illuminate the same in front of a vehicle; and low beam reflectors (342, 343) disposed below the low beam LED light source (45), the low beam reflectors having a downwardly curved shape so as to reflect light from the low beam LED light source (45) to illuminate the front of the vehicle; a lens (33) allowing the light from the high beam LED light source (46) and low beam LED light source (45) having been reflected by the high beam reflector (341) and low beam reflectors (342, 343) and illuminated in front of the vehicle, to pass through, wherein the low beam LED light source (45) is located on either side of the high beam LED light source (46) and disposed in front of the high beam LED light source (46), the high beam reflector (341) is longer than the low beam reflectors (342, 343) in a front-rear direction, and front lower end portions of the low beam reflectors (342, 343) are positioned in front of the high beam reflector (341).

The present invention has a second feature in that light shielding walls (36, 37) are provided between the low beam reflectors (342, 343) and the high beam reflector (341).

The present invention has a third feature in comprising edging members (35L, 35R) attached to edges of the low beam reflectors (342, 343).

The present invention has a fourth feature in that the edging members (35L, 35R) are extensions colored in a color different from the low beam reflectors (342, 343).

The present invention has a fifth feature in that the high beam LED light source (46) and the low beam LED light source (45) are plurally provided with respect to the high beam reflector (341) and the low beam reflectors (342, 343) respectively.

The present invention has a sixth feature in that the high beam LED light source (46) is disposed substantially center in a vehicle width direction.

The present invention has a seventh feature in further comprising a position light (41) provided on both lateral outer sides of the low beam LED light source (45), the position light being long in a vertical direction. And the present invention has an eighth feature in the position light (41) is constructed by disposing a plurality of LEDs in the vertical direction.

Advantageous Effects of Invention

According to the invention having a first feature, a low beam LED light source is located on either side of a high beam LED light source and disposed in front of the high beam LED light source, a high beam reflector is longer than low beam reflectors in a front-rear direction, and front lower end portions of the low beam reflectors are positioned in front of the high beam reflector. Therefore, with light distribution characteristics necessary as the high beam secured, the high beam LED light source can be disposed behind the low beam LED light source, and additionally the front lower end portion of the high beam reflector can be disposed behind those of the low beam reflectors. As a result, the light-emitting image of the low beam can be emphasized even when the high beam LED light source is on, as a matter of course when the high beam LED light source is off.

According to the invention having a second feature, light shielding walls are provided between the low beam reflectors and the high beam reflector. Therefore, the effects of interference on light from the low beam LED light source by light from the high beam LED light source can be reduced by the light shielding walls thereby to emphasize the light-emitting image of the low beam.

According to the invention having third and fourth features, edging members attached to edges of the low beam reflectors are provided and the edging members are extensions colored in a color different from the low beam reflectors. Therefore, the light-emitting image of the low beam can be emphasized and also a unique appearance can be provided by providing the edging members such as extensions to edges of the low beam reflectors.

According to the invention having a fifth feature, the high beam LED light source and the low beam LED light source are plurally provided with respect to the high beam reflector and the low beam reflectors respectively. Therefore, the quantity of light of the headlight can be increased easily.

According to the invention having a sixth feature, the high beam LED light source is disposed substantially center in a vehicle width direction. Therefore, the light-emitting image of the low beam can be visually recognized by disposing the low beam reflectors in the vehicle width direction.

According to the invention having a seventh feature, a position light is provided on both lateral outer sides of the low beam LED light source, the position light being long in a vertical direction. Therefore, the position lights can be positioned on either side of the vehicle, so that visibility from the sides of the vehicle body can be improved.

According to the invention having an eighth feature, the position light is constructed by disposing a plurality of LEDs in the vertical direction. Therefore, the light-emitting image by the LEDs can be exhibited in the position lights as well.

DESCRIPTION OF EMBODIMENTS

Figure 1:
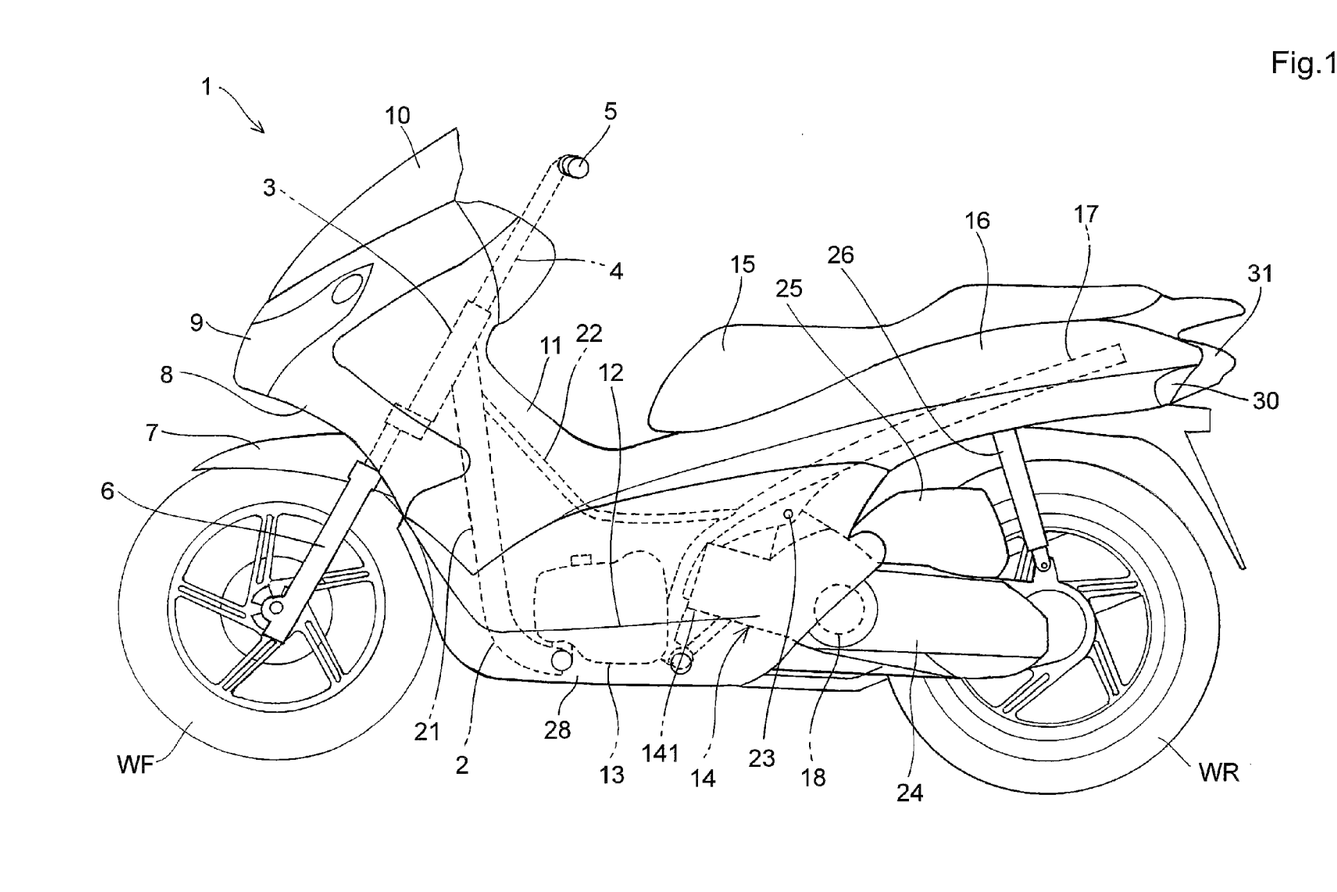
FIG. 1 is a left side view of a motorcycle having a headlight device according to one embodiment of the present invention.

Hereinafter, one embodiment of the present invention will be described with reference to the drawings. FIG. 1 is a left side view of a motorcycle having a headlight device according to one embodiment of the present invention. The left-right direction, the front-rear direction, and the up-down direction are directions with reference to a motorcycle 1 in the following description. The motorcycle 1 is a motor scooter-type vehicle having a straddle portion 11 extending in the front-rear direction of the vehicle body and low floors 12 positioned on either side of the straddle portion 11. A steering stem 4 is vertically penetrated through a head pipe 3 positioned at the forefront of a vehicle body frame 2, and is rotatably supported. The steering stem 4 has an upper portion attached with a steering handle 5 and has a lower portion attached with a front fork 6 composed of a pair of left and right tubes. To the front fork 6, a front wheel WF is rotatably supported at the lower end portion of the front fork 6 and a front fender 7 covering an upper portion of the front wheel WF below the head pipe 3 is provided.

A front cowl 8 covering the upper portions of the head pipe 3 and steering stem 4 is provided with a headlight 9 and a visor 10. The headlight 9 is supported by an unillustrated bracket coupled to the head pipe 3.

The vehicle body frame 2 is constituted of a down frame 21 joined to the head pipe 3 and extending downward, an upper frame 22 joined to an upper portion of the down frame 21 and extending rearward, and a rear frame 17 joined to a rear end of the upper frame 22 and extending rearward. A seat 15 on which a driver and a fellow passenger sit is mounted on the rear frame 17. There is provided a main cowl 16 including the straddle portion 11 and covering a lower part of the seat 15 and the rear frame 17 from both sides. Side cowls 28 covering an engine 141 from both sides and extending as far as the low floors 12 are provided below the main cowl 16.

There is provided a fuel tank 13 located below the upper frame 22 and having front and rear portions respectively coupled to a rear portion of the down frame 21 and a front portion of the rear frame 17. A power unit 14 provided on an intermediate portion in the rear frame 17 and including the engine 141 is supported by a pivot 23 extending laterally so as to be vertically swingable. The power unit 14 has a power transmission unit 24 extending further rearward from a crankcase 18. The power transmission unit 24 has an unillustrated V-belt transmission and transmits the rotation of the engine 141 to the rear wheel WR via this transmission. To an upper portion of the power unit 14, an air cleaner 25 cleaning the air to be supplied to the engine 141 is provided and rear cushions 26 connecting between a rear portion of the power unit 14 and the rear frame 17 are provided. Rear blinker lights 30 and a tail light 31 are provided at the rear of the main cowl 16.

Figure 2:
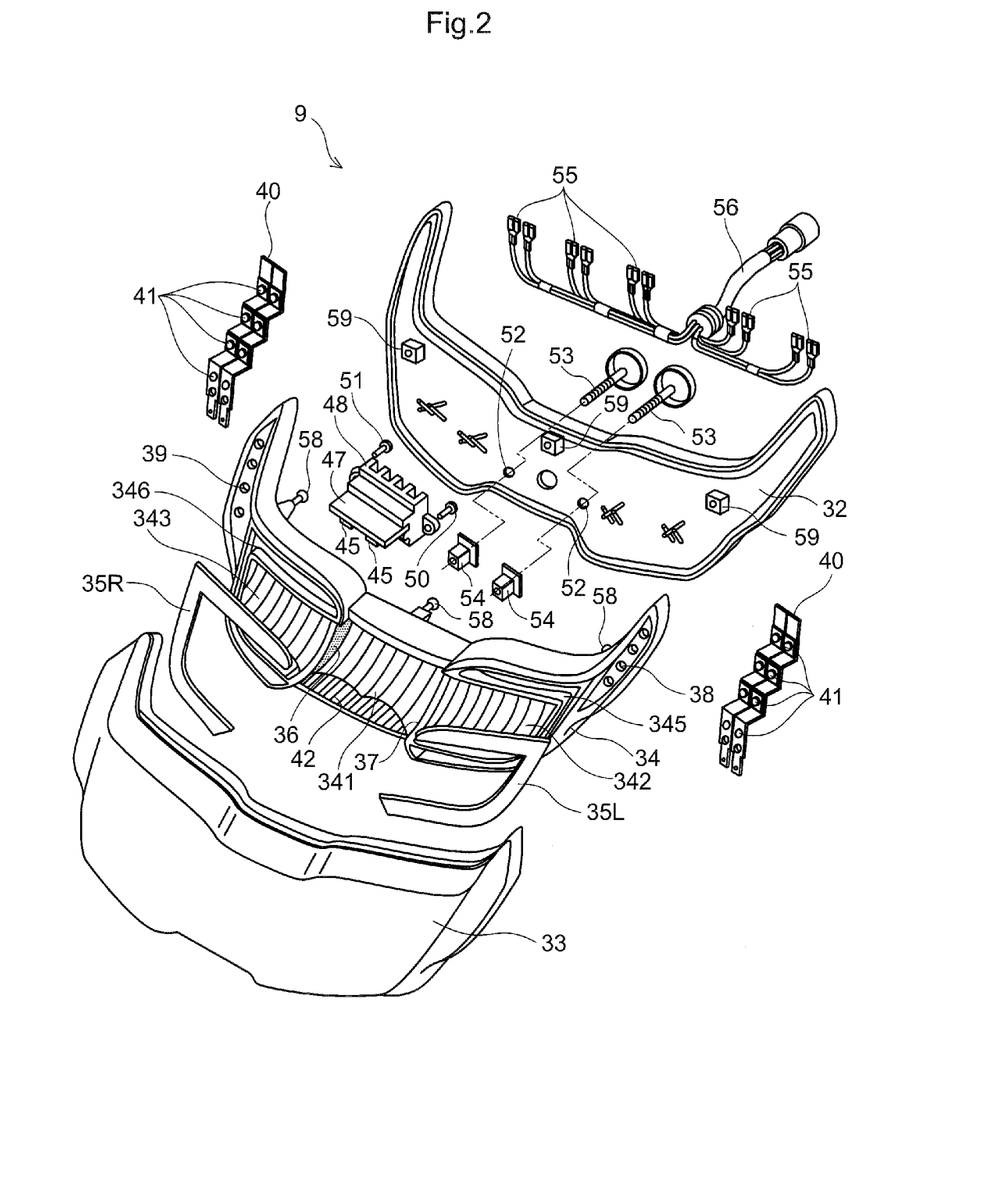
FIG. 2 is an exploded perspective view of the headlight device.
Figure 3:
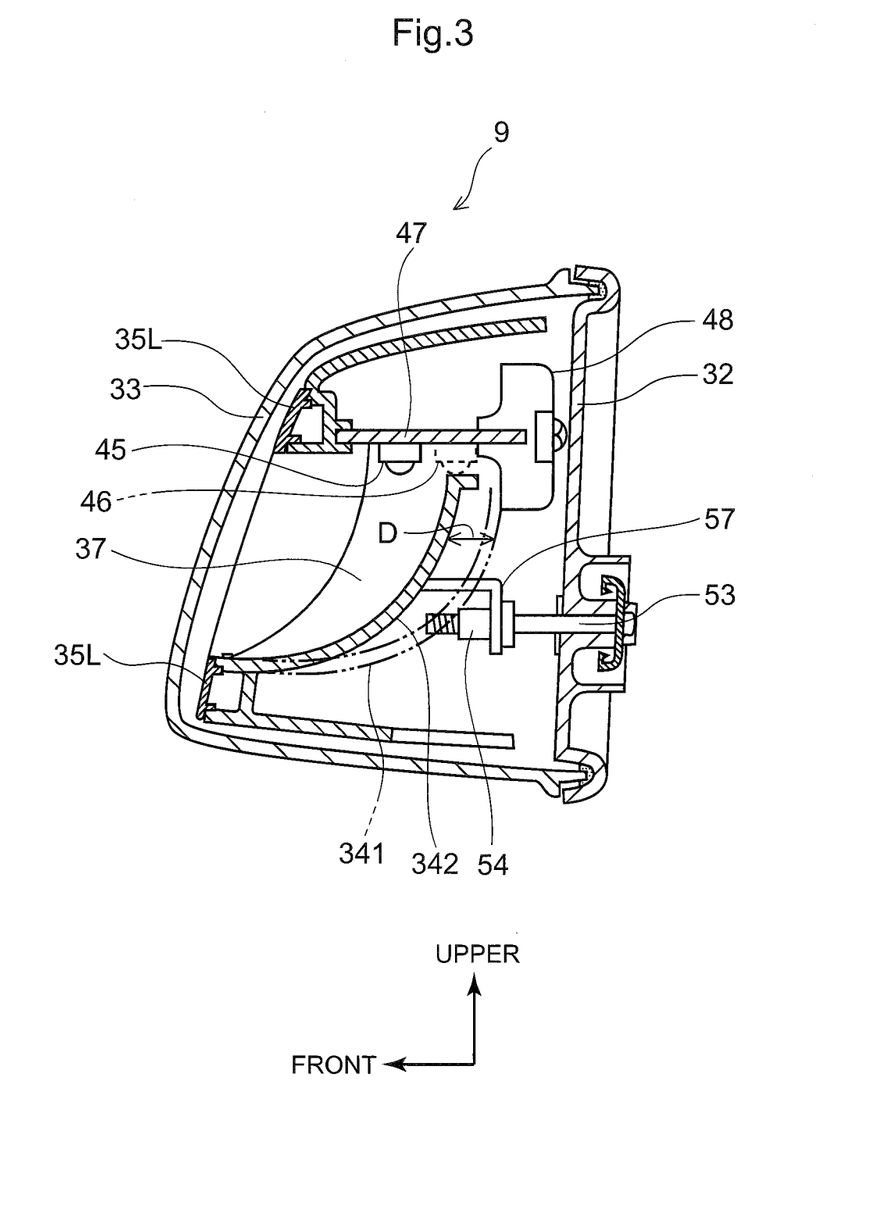
FIG. 3 is a cross sectional view of a longitudinal cross section through a left low beam light as viewed from the left.
Figure 4:
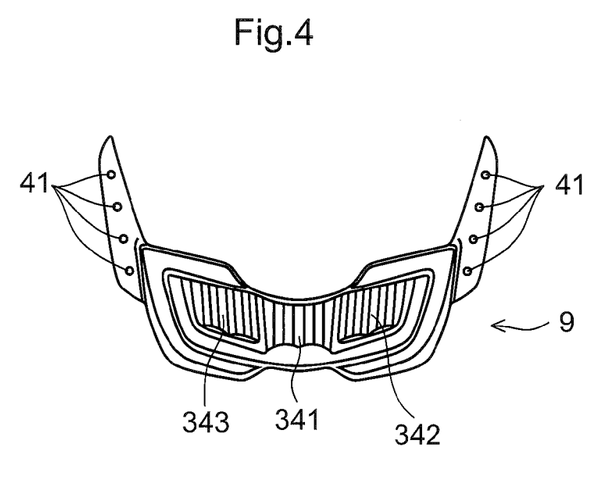
FIG. 4 is a front view of the headlight.
Figure 5:
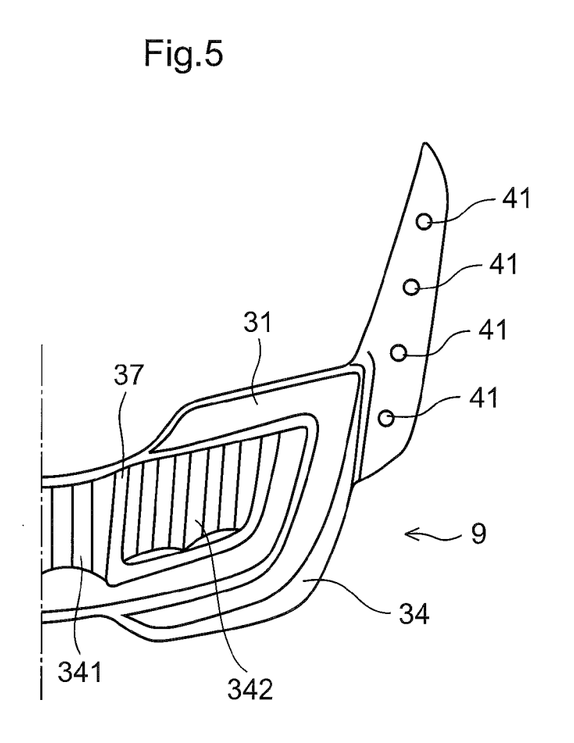
FIG. 5 is an enlarged view of the right half of FIG. 4
Figure 6:
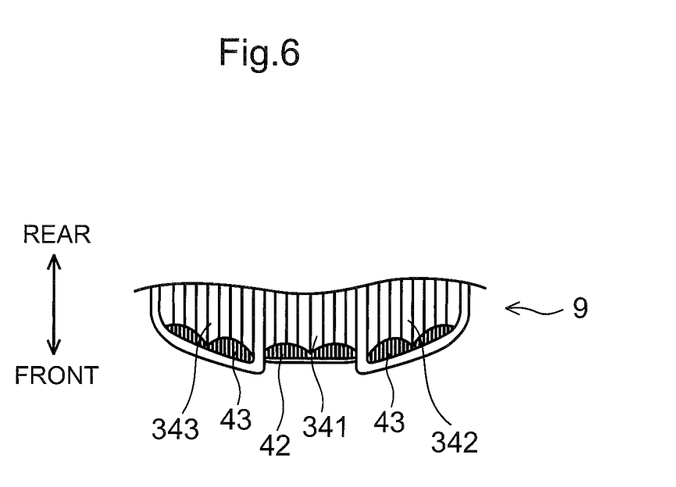
FIG. 6 is a top view of a front portion of the headlight.

FIG. 2 is an exploded perspective view of the headlight 9 as viewed from the front upper left of the vehicle body, and FIG. 3 is a cross sectional view of a longitudinal cross section through a left low beam light as viewed from the left. Further, FIG. 4 is a front view of the headlight 9, FIG. 5 is an enlarged view of the right half of FIG. 4, and FIG. 6 is a top view of a front portion of the headlight 9. In FIGS. 2 to 6, the headlight 9 is constituted of a base member 32, a lens 33, a reflector 34 provided between the base member 32 and the lens 33, and extension plates 35L, 35R serving as edging members. The reflector 34 has a high beam reflector 341 positioned in the center in the vehicle width direction of the headlight 9 and low beam reflectors 342, 343 respectively positioned on either side of the high beam reflector 341.

The high beam reflector 341 is positioned behind the low beam reflectors 342, 343, and the high beam reflector 341 and the low beam reflectors 342, 343 are arranged with a step D (see FIG. 3) in the front-rear direction of the vehicle body. The high beam reflector 341 is longer than the low beam reflectors 342, 343 in the front-rear direction by this step D. Partition walls 36, 37 serving as light shielding walls are provided between the high beam reflector 341 and the low beam reflectors 342, 343. These partition walls 36, 37 clearly partition the high beam reflector 341 and the low beam reflectors 342, 343.

Front parts 42, 43 of curved reflecting surfaces of the high beam reflector 341 and low beam reflectors 342, 343 are painted surfaces respectively. As shown in FIG. 6, front lower end portions of the low beam reflectors 342, 343 are positioned in front of a front lower end portion of the high beam reflector 341 to emphasize a distinction between the high beam reflector 341 and the low beam reflectors 342, 343.

As just described, the high beam reflector 341 is arranged rearward with respect to the low beam reflectors 342, 343. Therefore, boundaries between the high beam reflector 341 and the low beam reflectors 342, 343 are clearly distinguished in appearance.

The extension plates 35L, 35R are plastic plate materials and colored in a color different from the low beam reflectors 342, 343 such as orange. The extension plates 35L, 35R have substantially the same shape as grooves 345, 346 formed at three sides, the top, bottom, and lateral (an outer part in the vehicle width direction) sides of outer edge portions of the low beam reflectors 342, 343 such that the extension plates 35L, 35R can cover front open portions of the grooves 345, 346. The extension plates 35L, 35R work together with the partition walls 36, 37 to edge the low beam reflectors 342, 343 and clearly distinguish the boundaries between the high beam and the low beams to provide a unique appearance.

Openings 38, 39 for position lights are plurally formed arranged vertically in tandem on the left side of the reflector 342 and the right side of the reflector 343 respectively. Position lights 41 composed of a plurality of LEDs arranged vertically in tandem on substrates 40 so as to be aligned with these openings 38, 39 are provided. The plurality of LEDs forming the position lights 41 (four LEDs in the present embodiment) are arranged stepwise in the front-rear direction, that is, the upper the LEDs, the more rearward they are positioned. The position lights 41 are attached in back of the reflector 34 via the substrates 40. Light from each LED 41 is illuminated forward through the openings 38, 39. Instead of the position lights 41, blinker lights may be provided at positions where the position lights 41 are provided. The position lights are provided in back of the extension plates 35L, 35R and the extensions 31 are made translucent, thereby allowing the light to be illuminated forward. In this case, LEDs may be disposed, as light sources of the position lights, within the grooves 345, 346 whose front surfaces are covered by the extension plates 35L, 35R. Light guide members may be disposed within the grooves 345, 346 to guide the light to the grooves 345, 346 from light source LEDs for position lights separately provided. Further, the extension plates 35L, 35R themselves may be used as light guide plates.

A high beam LED light source 46 is provided above the high beam reflector 341. A low beam LED light source 45 is provided above the low beam reflectors 342, 343 and in front of the high beam LED light source 46 in a side view. The low beam LED light source 45 and the high beam LED light source 46 can both be arranged plurally in the vehicle width direction (two are provided in the example of FIG. 2). The low beam LED light source 45 and the high beam LED light source 46 are respectively mounted on a lower surface of a substrate 47, and an illumination direction of light is oriented downward. The substrate 47 is fixed to a terminal block 48. This terminal block 48 is attached, by fastening screws 50, 51, to an attachment portion (unillustrated) such as a boss formed on a back surface of the reflector 34. Although only the right low beam LED light sources 45 are shown in FIG. 2, the left low beam LED light source 45 and the high beam LED light source 46 are similarly configured by arranging two LEDs on a substrate.

A plurality of connectors 55 are respectively connected to a plurality of feeding terminals (unillustrated) provided on the terminal block 48. The plurality of connectors 55 are tied as a harness 56 and arranged.

According to the configuration of having this reflector 34 and the light sources 45, 46, the light illuminated downward from the high beam LED light source 46 is reflected by the high beam reflector 341 to be oriented forward and illuminated outside through the lens 33. Similarly, the light illuminated downward from the low beam LED light source 45 is reflected by the low beam reflectors 342, 343 to be oriented forward and illuminated outside through the lens 33.

In this headlight 9, the step D between the high beam reflector 341 and the low beam reflectors 342, 343 is provided such that the high beam reflector 341 and the low beam reflectors 342, 343 can be clearly recognized visually, and also the length sufficient to achieve light distribution characteristics required as the high beam in the front-rear direction is secured by locating the high beam reflector 341 rearward away from the low beam reflectors 342, 343 on the whole.

On the back surface of the reflector 34, protrusions 58 having spherical distal ends are provided at a plurality of places (three places in this example), and pieces 59 having recesses fitted for the protrusions 58 are joined onto the front surface of the base member 32. Assembling the reflector 34 into the base member 32 constitutes a universal joint in which the protrusions 58 and the recesses of the pieces 59 are engaged with each other, and the reflector 34 is supported to the base member 32 by this universal joint.

Further, a plurality of through holes 52 are formed (two are formed in this example) in a central part of the base member 32, and adjusting screws 53 for optical axis adjustment are inserted into the through holes 52 from behind. The adjusting screws 53 are passed through the through holes 52 and then screwed into nuts 54. The nuts 54 are fixed to ribs 57 joined onto the back surfaces of the low beam reflectors 342, 343.

According to this configuration, the nuts 54 are displaced back and forth by turning the adjusting screws 53 to feed the nuts 54 back and forth, and the angle of the reflector 34 is changed around the universal joint composed of the protrusions 58 and the pieces 59 having the recesses. The optical axis adjustment is made by this angle change adjustment.

According to the present embodiment, as described above, light distribution characteristics required as the high beam are secured, and at the same time, the light-emitting image of the low beam can be emphasized and a unique appearance of the low beam can be provided by arranging the high beam LED light source 46 behind the low beam LED light source 45, providing the light shielding walls 36, 37, and providing the extensions 35L, 35R.

REFERENCE SIGNS LIST

1 . . . motorcycle,
9 . . . headlight,
34 . . . reflector,
35L, 35R . . . extension plate,
36, 37 . . . light shielding wall (partition wall),
45 . . . low beam LED light source,
46 . . . high beam LED light source,
341 . . . high beam reflector,
342, 343 . . . low beam reflector

The invention claimed is:
1. A headlight device of a motorcycle comprising:
  a high beam LED light source;
  at least one first low beam LED light source located on a first side of the high beam LED light source and at least one second low beam LED light source located on a second side of the high beam LED light source;
  a high beam reflector disposed below the high beam LED light source, the high beam reflector having a downwardly curved shape so as to reflect light from the high beam LED light source to illuminate the front of a vehicle; and
  low beam reflectors disposed below the at least one first low beam LED light source and the at least one second low beam LED light source respectively, the low beam reflectors having a downwardly curved shape so as to reflect light from the at least one first low beam LED light source and the at least one second low beam LED light source respectively to illuminate the front of the vehicle;

a lens allowing the light from the high beam LED light source, the at least one first low beam LED light source, and at least one second low beam LED light source having been reflected by the high beam reflector and low beam reflectors and illuminated in front of the vehicle, to pass through, wherein the at least one first low beam LED light source and the at least one second low beam LED light source are disposed in front of the high beam LED light source, the high beam reflector is longer than the low beam reflectors in a front-rear direction, and front lower end portions of the low beam reflectors are positioned in front of the high beam reflector.

2. The headlight device of the motorcycle according to claim 1, wherein light shielding walls are provided between the low beam reflectors and the high beam reflector.

3. The headlight device of the motorcycle according to claim 1 or 2, further comprising edging members attached to edges of the low beam reflectors.

4. The headlight device of the motorcycle according to claim 3, wherein the edging members are extensions colored in a color different from the low beam reflectors.

5. The headlight device of the motorcycle according to claim 1 or 2,
wherein the high beam reflector is provided with at least two high beam LED light sources, and
wherein the low beam reflectors are provided with at least two first low beam LED light sources and at least two second low beam LED light sources respectively.

6. The headlight device of the motorcycle according to claim 1 or 2, wherein the high beam LED light source is disposed substantially center in a vehicle width direction.

7. The headlight device of the motorcycle according to claim 1 or 2, further comprising a position light provided on both lateral outer sides of the at least one first low beam LED light source and the at least one second low beam LED light source, the position light being long in a vertical direction.

8. The headlight device of the motorcycle according to claim 7, wherein the position light is constructed by disposing a plurality of LEDs in the vertical direction.

* * * * *